United States Patent
Park et al.

(10) Patent No.: US 6,574,517 B1
(45) Date of Patent: Jun. 3, 2003

(54) METHOD OF PROCESSING MULTI-FUNCTION KEY INPUTTING DEVICE

(75) Inventors: Chan-Kyung Park, Kyungki-do (KR); Tae-San Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 294 days.

(21) Appl. No.: 09/580,488

(22) Filed: May 30, 2000

(30) Foreign Application Priority Data

Sep. 1, 1999 (KR) ............................................. 99-36795

(51) Int. Cl.$^7$ ............................................. G05B 15/00
(52) U.S. Cl. ............................. 700/84; 700/85; 700/23; 700/86; 341/23; 341/26; 341/22; 400/485; 400/490
(58) Field of Search ............................. 700/25, 23, 17, 700/83, 84, 86; 340/564, 825.69, 825.24, 825.56; 707/1–3; 341/22–23, 26–27; 400/490, 485

(56) References Cited

U.S. PATENT DOCUMENTS

| | | | | |
|---|---|---|---|---|
| 4,211,915 A | * | 7/1980 | Miller et al. | 324/73.1 |
| 4,617,554 A | * | 10/1986 | Krause et al. | 341/26 |
| 5,254,989 A | * | 10/1993 | Verrier et al. | 341/22 |
| 5,262,940 A | * | 11/1993 | Sussman | 235/385 |
| 5,528,235 A | * | 6/1996 | Lin et al. | 200/343 |
| 5,568,987 A | * | 10/1996 | Franz | 400/485 |
| 5,634,134 A | * | 5/1997 | Kumai et al. | 704/8 |
| 5,860,075 A | * | 1/1999 | Hashizume et al. | 382/190 |

FOREIGN PATENT DOCUMENTS

JP 02001084085 A * 3/2001 ............ G06F/3/023

* cited by examiner

Primary Examiner—Ramesh Patel
(74) Attorney, Agent, or Firm—Lowe Hauptman Gilman & Berner, LLP

(57) ABSTRACT

In a method of processing a multi-function key in a key inputting device, such as a multimedia keyboard, the scan code value of the multi-function key consists of the "windows key code" as a first value, one or more code keys of "ctrl", "alt" and "shift" as a second value, and "a selected key code" as the third value, thereby forming a scan code value of the multi-function key being made to not overlap with a normal key or a combination of the normal keys, thereby preventing any collision or overlapping of codes, and ensuring the stability of the key codes.

8 Claims, 2 Drawing Sheets

METHOD OF PROCESSING MULTI-FUNCTION KEY INPUTTING DEVICE

BACKGROUND OF THE INVENTION

1. Field of the Invention

The present invention relates to a method of processing a multi-function key in a key inputting device such as a multimedia keyboard or the like. Particularly, the present invention relates to a method of processing a multi-function key in a key inputting device, in which a scan code value of a multi-function key or a hot key besides the normal key is made to not overlap with a normal key or a combination of normal keys, thereby preventing any collision or overlapping of codes, and ensuring the stability of the key codes.

2. Description of the Related Art

Generally, in a key inputting device, relevant keys are selected to input intended information and commands. There are various kinds of key inputting devices, such as a computer keyboard, a keypad of an electronic calculator, a keypad of a cash register, an electronic porch key and the like. Among them, in computer keyboards, formerly 101 keys and 103 keys were used, but recently, 106 keys (U.S.: 104 keys; Europe: 105 keys, Japan: 109 keys) have come to be widely used.

FIG. 1 is a block diagram showing the schematic constitution of the computer keyboard which is an example of the key inputting devices. As shown in FIG. 1, in a keyboard using 106 keys, if the user selects an arbitrary key, then a control section 12 scans the selected key code value through a key matrix 11, and reads a key code (corresponding to the scanned value) from a key code table which is called a "code set". Then the control section 12 furnishes the key code value to a keyboard control section of the computer main body.

The code set which is included in the control section 12 has all the key code values for the 106 keys. The key code value which corresponds to the user's selected key is read from the code set by the control section 12 to transmit it to the keyboard control section of the computer main body.

However, the functions of the computer have gradually become more sophisticated, such as providing for the multimedia functions, and therefore, besides the existing 106 keys, additional keys such as multi-function keys and hot keys (to be called by the general term of multi-function keys below) are provided. In the case where such multi-function keys are added, the key code value of a multi-function key should not overlap with a normal key code value or a combination of two or more normal keys, but should be distinguishable. Only then, can the computer carry out the normal operations for the relevant key.

Meanwhile, multi-function keys include, for example: volume-up/down, mute, eject, reproduction, pause, stop reproduction, forward winding, reverse winding (rewind), closing, web site, electronic mail, menu, game, MS-DOS, program 1, program 2, program 3, picture protection (screen saver), power-down and the like.

The conventional method of avoiding the overlap between a multi-function key and a normal key or a combination of two normal keys is illustrated in FIG. 2. This will be described below.

Referring to FIG. 2, the conventional method of processing the multi-function key of a key inputting device is carried out in the following manner. That is, at a step s21, the control section 12 carries out a key scan. At a next step s22, if there is a key input, then a judgment is made as to whether the inputted key is a multi-function key. If it is not a multi-function key, then it is recognized as a normal key. Thus at a step s24, a scan code value corresponding to the normal key is formed. On the other hand, if the inputted key is a multi-function key, then a scan code value corresponding to the multi-key is formed at a step s23.

Now the conventional method of forming the scan code value corresponding to the multi-function key at the step s23 will be described. If the inputted key is judged to be a multi-function key, then a particular code value "EO" is added. That is, "EO+relevant key code" is formed as the code value of the inputted multi-function key to be transmitted to the computer main body.

In this conventional multi-function key processing method, if a multi-function key is selected, the character or operation which corresponds to the multi-function key can be carried out by the editor under the "Windows" environment. However, under the DOS environment, there is the problem that the character or the numeral corresponding to the normal key is displayed on the screen. Further, in application software or in game software, if "alt" or "ctrl" or combined keys are used, there is the problem that an overlap occurs between the multi-function key and the normal key.

SUMMARY OF THE INVENTION

The present invention is intended to overcome the above described disadvantages of the conventional techniques.

Therefore it is an object of the present invention to provide a method of processing a multi-function key in a key inputting device, in which a scan code value of a multi-function key or a hot key besides the normal key is made not to overlap with a normal key or a combination of the normal keys under the "Windows" and DOS environments, thereby preventing any collision or over lapping of codes, and ensuring the stability of the key code.

In achieving the above object, the method of processing a multi-function key in a key inputting device according to the present invention includes the steps of: key-scanning a key input of a user (first step); judging to whether the key input of the user is a multi-function key (second step); adopting a code value of a "windows key" as a first value,connecting one or more code values of "ctrl", "alt" and "shift" keys as a second value, and connecting a next key code value of the user as a third value, if the key input is found to be a multi-function key at the sec on d step, and forming a scan code value composed of the first to third values correspond to the multi-function key (third step); and recognizing the key input as a normal key if the key input is found not to be a multi-function key at the second step, and forming a code value corresponding to a normal key (fourth step).

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Now the present invention will be described in detail referring to the attached drawings.

Figure 1:
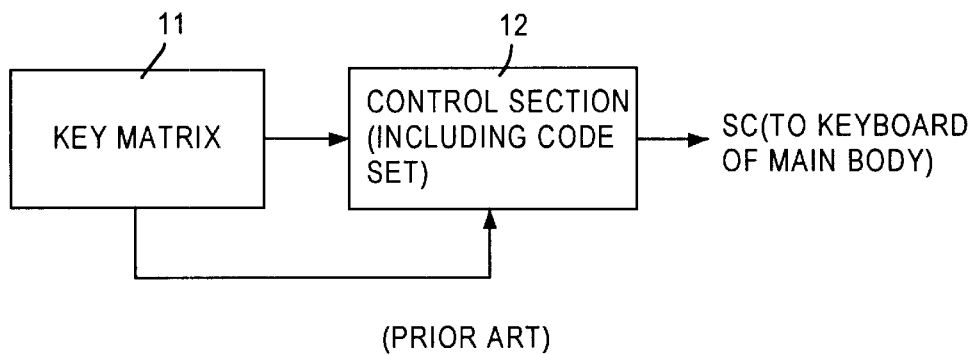
FIG. 1 is a block diagram showing the schematic constitution of a computer keyboard which is an example of a key inputting device.
Figure 2:
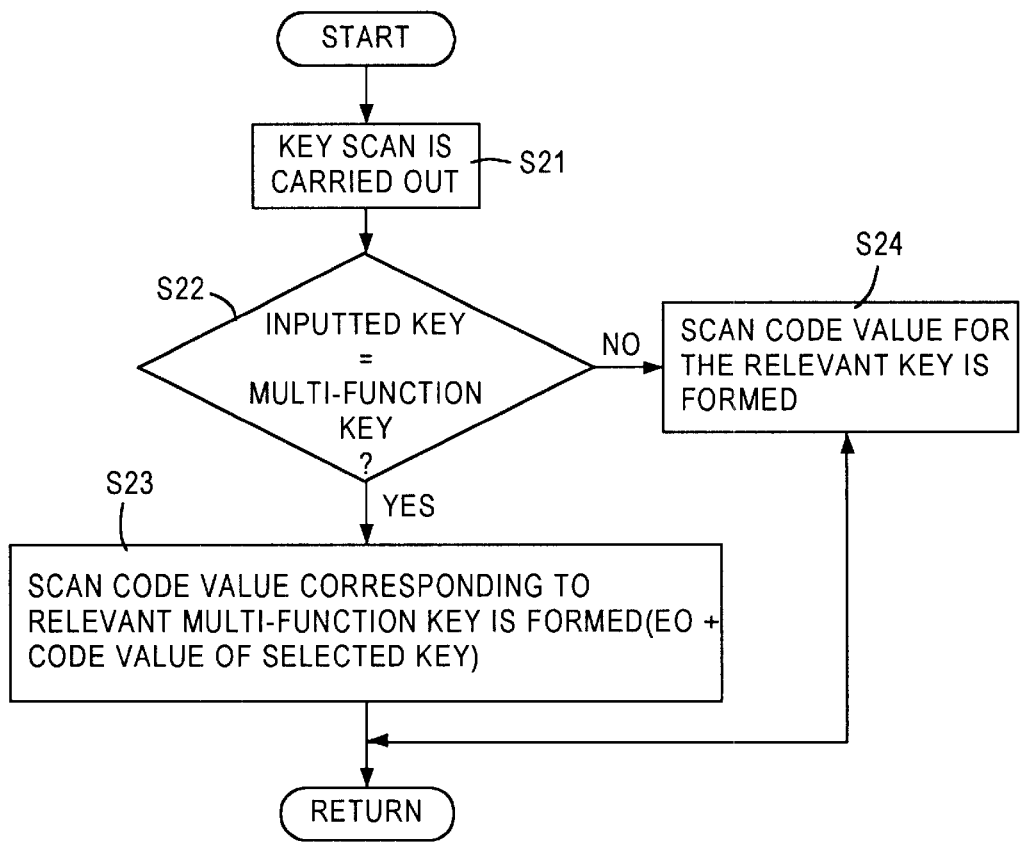
FIG. 2 is a flowchart showing a conventional method of processing a multi-function key.

FIG. 1 is a block diagram showing the schematic constitution of a computer keyboard which is an example of a key inputting device. Referring to FIG. 1, the key inputting device according to the present invention includes a key matrix 11 for forming a particular contact voltage corresponding to a key selection and a control section 12. The control section 12 carries out a key-scanning over a key input of a user, and then, judges whether the key input of the user is a multi-function key. If the key input is found to be a multi-function key, the control section 12 adopts a code value of a "windows key" as a first value, then connects one or more code values of "ctrl", "alt" and "shift" keys as a second value, and then connects a next key code value of the user as a third value, so as to form a scan code value composed of the first to third values corresponding to the multi-function key. If the key input is not found to be a multi-function key, then the control section 12 recognizes the key input as a normal key so as to form a code value corresponding to the normal key.

The control section 12 can be designed to be capable of forming a scan code value by adopting the code value of a "windows key" as the first value, by connecting at least two code values from among the code values of "ctrl", "alt" and "shift" keys as the second value, and by connecting the code value of the user's selection as the third value, thereby forming a scan code value corresponding to the multi-function key. In the preferred embodiment of the present invention, the scan code value is set with the code values of "windows key"+"ctrl" +"alt"+"selection key".

In a preferred embodiment of the present invention, the scan code value of the multi-function key can be formed as follows. That is, the code value of" a "windows key" is adopted as the head, and then, a code value corresponding to three keys i.e., "ctrl", "alt" and "shift" keys is attached to it. Then the directly selected code value is attached to it, thereby forming a scan code value corresponding to the multi-function key.

Now the operations of the key inputting device according to the present invention will be described referring to the attached drawings.

Figure 3:
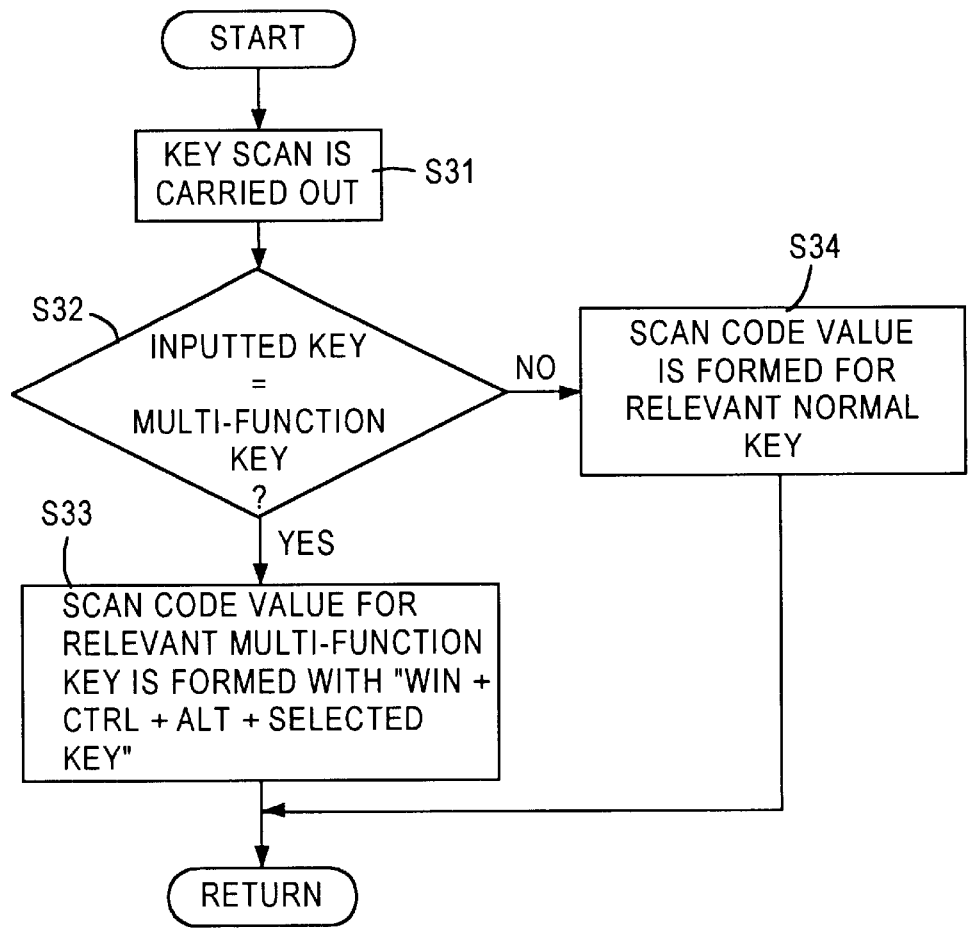
FIG. 3 is a flowchart showing a multi-function key processing method according to an embodiment of the present invention.

Referring to FIGS. 1 and 3, at a first step s31, the control section 12 scans the user's inputted key through a key matrix 11. Under this condition, the scanning method is as follows. That is, the voltage which is formed by the connection between the row and column during the key selection is received, thereby recognizing which key has been selected.

At a second step s32, if there was a key selection at the first step s31, a judgment is made as to whether the inputted key is a multi-function key. If it is judged to be a multi-function key, then the system advances to a third step s33 for forming a scan code value for the multi-function key. On the other hand, if it is not a multi-function key, then the system advances to a fourth step s34 for forming a scan code value for a normal key.

Further, if it is found to be a multi-function key at the third step s33, the scan code value of the multi-function key is adopted as the head, and then, a code value corresponding to three keys i.e., "ctrl", "alt" and "shift" keys is attached to it. Then the user's directly selected code value is attached to it, thereby forming a scan code value corresponding to the multi-function key (first value+second value+third value).

At the third step s33, the scan code value of the multi-function key can be formed as follows. That is, the code value of a "windows key" is adopted as the head, and then, at least two or more code values from among "ctrl", "alt" and "shift" keys are attached to it. Then a directly selected code value is attached to it, thereby forming a scan code value corresponding to the multi-function key. In the preferred embodiment of the present invention, a scan code value is formed with the code values of "windows key"+ "ctrl"+"alt"+"selection key".

At present, keyboards which include 106 normal keys are different in their functions depending on the products, but generally, about 20 kinds of multi-function keys are available. In the preferred embodiment of the present invention, the multi-function keys and the relevant scan code values can be summarized as shown in Table 1 below.

TABLE 1

| Multi-function key | Scan code value |
| --- | --- |
| Volume up | win + ctrl + alt + F11 |
| Volume down | win + ctrl + alt + F12 |
| Mute | win + ctrl + alt + N |
| Eject | win + ctrl + alt + O |
| Play/pause | win + ctrl + alt + U |
| Reproduction stop | win + ctrl + alt + S |
| Forward wind | win + ctrl + alt + D |
| Rewind | win + ctrl + alt + L |
| Close | win + ctrl + alt + J |
| Web sitC,(www) | win + ctrl + alt + X |
| e-mail | win + ctrl + alt + C |
| Menu | win + –ctrl + alt + V |
| MS-DOS | win + ctrl + alt + T |
| Program 1 | win + ctrl + alt + G |
| Program 2 | win + ctrl + alt + H |
| Program 3 | win + ctrl + alt + K |
| Screen saver | win + ctrl + alt + B |
| Suspend, | power-down win + ctrl + alt + SPACE BAR |
| Explorer | win + ctrl + alt + K |

As shown in Table 1 above, the windows key "win" is adopted as the head, i.e., as a first value, and at least one of "ctrl", "alt" and "shift", i.e., one or two or three of them can be used regardless of the sequence of the key codes. However, in the preferred embodiment of the present invention, in consideration of the code data size and the overlap of the code values, the "windows key" is adopted as the head, and then, two code values, i.e., "ctrl" and "alt" are attached to form a second code value. Then finally, the user's selected key code value is attached as a third value, thereby forming a final scan code value for the multi-function key.

In a preferred embodiment of the present invention, in order to avoid the overlap, the scan code value for the multi-key can be formed as follows at the third step s33. That is, the code value of "windows key" is adopted as the head, and then, the code values of "ctrl", "alt" and "shift" are attached to it. Then the user's directly selected key code value is attached, thereby forming a scan code value corresponding to the multi-function key.

Finally at the fourth step, if it is found not to be a multi-function key at the second step s32; then it is recognized as a normal key to form a code value for a normal key.

In the above, the present invention was described based on the specific preferred embodiment and the attached drawings, but it should be apparent to those of ordinary skill in the art that various changes and modifications can be added without departing from the spirit and scope of the present invention which will be defined in the appended claims.

According to the present invention as described above, a scan code value of a multi-function key or a hot key besides the normal key is to not overlap with a normal key or a combination of the normal keys, thereby preventing any collision or overlapping of codes, and ensuring the stability of the key codes.

What is claimed is:

1. A method of processing a multi-function key in a key inputting device, comprising the steps of:

a first step of key-scanning a key input of a user;

a second step of determining whether the key input of the user is a multi-function key;

a third step of forming a scan code value consisting of a "windows key" code as a first value, one or more key codes of "ctrl", "alt" and "shift" keys as a second value, and a selected key code as a third value, if the key input of the user is determined to be a multi-function key at the second step.

2. The method as claimed in claim 1, wherein at the third step, the second value comprises at least two or more codes of "ctrl", "alt" and "shift".

3. The method as claimed in claim 2, wherein the scan code value of the multi-function key is set with codes of "windows key"+"ctrl"+"alt"+"user's key" code.

4. The method as claimed in claim 2, wherein the scan code value of the multi-function key is set with codes of "windows key"+"ctrl"+"alt"+"shift"+"user's selected key" code.

5. A method of processing a multi-function key in a key inputting device, said key inputting device consisting of a keyboard, and a control section scanning a key selection through a key matrix to form a relevant key code value and adapted to furnish the key code value to a keyboard control section of a computer main body, the method comprising the steps of:

a first step of key-scanning a key input of a user;

a second step of determining whether the key input of the user is a multi-function key;

a third step of forming a scan code value consisting of a "windows key" code as a first value, one or more key codes of "ctrl", "alt" and "shift" keys as a second value, and a selected key code as a third value, if the key input of the user is determined to be a multi-function key at the second step.

6. The method as claimed in claim 5, wherein at the third step, the second value is two or more key codes of "ctrl", "alt" and "shift".

7. The method as claimed in claim 6, wherein the scan code value of the multi-function key is set with codes of "windows key"+"ctrl"+"alt"+"user's selected key" code.

8. The method as claimed in claim 6, wherein the scan code value of the multi-function key is set with codes of "windows key"+"ctrl"+"alt"+"shift"+"user's selected key" code.

\* \* \* \* \*